US009023750B2

(12) United States Patent (10) Patent No.: US 9,023,750 B2
Parida et al. (45) Date of Patent: May 5, 2015

(54) RUTHENIUM COMPLEX INTERCALATED N-DOPED OR N,S-CODOPED TITANIA PILLARED MONTMORILLONITE AND A PROCESS FOR THE PREPARATION THEREOF

(75) Inventors: Kulamani Parida, Orissa (IN); Guru Bishwa Bidita Varadwaj, Orissa (IN); Prakash Chandra Sahoo, Orissa (IN); Swagatika Sahu, Orissa (IN)

(73) Assignee: Council of Scientific & Industrial Research, New Delhi (IN)

(*) Notice: Subject to any disclaimer, the term of this patent is extended or adjusted under 35 U.S.C. 154(b) by 533 days.

(21) Appl. No.: 13/250,316

(22) Filed: Sep. 30, 2011

(65) Prior Publication Data

US 2012/0178614 A1 Jul. 12, 2012

(30) Foreign Application Priority Data

Oct. 1, 2010 (IN) ............................ 2362/DEL/2010

(51) Int. Cl.
*B01J 29/04* (2006.01)
*B01J 35/00* (2006.01)
*B01J 21/06* (2006.01)
*B01J 23/46* (2006.01)
*B01J 37/03* (2006.01)

(52) U.S. Cl.
CPC ............... *B01J 35/004* (2013.01); *B01J 21/06* (2013.01); *B01J 23/462* (2013.01); *B01J 37/03* (2013.01)

(58) Field of Classification Search
USPC .................................... 502/62, 80, 81, 83, 85
See application file for complete search history.

(56) References Cited

U.S. PATENT DOCUMENTS 4,886,717 A * 12/1989 Jinno et al. ....................... 430/19
2006/0034752 A1 2/2006 Lin et al. ........................ 423/610

OTHER PUBLICATIONS

An-ning et al., "Visible Light Induced TiO2 pillared MMT photocatalyst coupling-doped with S and N", Journal of Coal Science & Engineering (China), vol. 14, No. 3, pp. 517-519, 2008.
Asahi et al., "Visible-Light Photcatalysis in Nitrogen-Doped Titanium Oxides", Science by the American Association for the Advancement of Science, vol. 293, pp. 269-271, 2001.
Bernier et al., "Synthesis and characterization of titanium pillared clays Influence of the temperature of preparation", Applied Catalysis, No. 77, pp. 269-281, 1991.
Binitha and Sugunan, "Preparation, characterization and catalytic activity of titania pillared montmorillonite clays", Microporous and Mesoporous Materials, No. 93, pp. 82-89, 2006.
Chang and Doong, "Characterization of Zr-Doped TiO2 Nanocrystals Prepared by a Nonhydrolytic Sol-Gel Method at High Temperatures", J. Phys. Chem. B, No. 110, pp. 20808-20814, 2006.
Chen et al., "Carbon and Nitrogen Co-doped TiO2 with Enhanced Visible-Light Photcatalytic Activity", Ind. Engl. Chem. Res., vol. 46, pp. 2741-2746, 2007.
DellaGuardia and Thomas, "Photoprocesses on Colloidal Clay Systems. Tris(2,2'-bipyridine)ruthenium(II) Bound to Colloidal Kaolin and Montmorillonite", J. Phys. Chem., vol. 87, pp. 990-998, 1983.
Dvininov et al., "Synthesis and characterization of TiO2-pillared Romanian clay and their application for azoic dyes photodegradation", Journal of Hazardous Material, vol. 167, pp. 1050-1056, 2009.
Einaga, "Hydrolysis of Titanium(IV) in Aqueous (Na,H) Cl Solution", J. Chem. Soc. Dalton Trans., vol. 12, pp. 1917-1919, 1979.
Emeline et al., "Photoelectrochemical Behavior of Nb-Doped TiO2 Electrodes", J. Phys. Chem. B, vol. 109, pp. 24441-24444, 2005.
Joshi et al., "On the Interaction of Poly(Pyridine)ruthenium(II) Optical Antipodes Intercalated in Montmorillonite Clay", J. Am. Chem. Soc., vol. 108, pp. 4650-4651, 1986.
Kaneko et al., "Synthesis and Photocatalytic Activity of Titania Pillared Clays", Journal of Porous Materials, vol. 8, pp. 295-301, 2001.
Kitayama et al., "Synthesis of Titania Pillared Saponite in Aqueous Solution of Acetic Acid", Journal of Porous Material, vol. 5, pp. 121-126, 1998.
Li et al., "Highly Active TiO2N Photocatalysts Prepared by Treating TiO2 Precursors in NH3/Ethanol Fluid under Supercritical Conditions", J. Phys. Chem. B, vol. 110, pp. 1559-1565, 2006.
Liu et al., "Preparation and photocatalytic activity of dysprosium doped tungsten trioxide nanoparticles", Materials Chemistry and Physics, vol. 104, pp. 377-383, 2007.
Nabivanets and Kudritskaya, "A Study of the Polymerisation of Titanium(IV) in Hydrochloric Acid Solutions", Russian Journal of Inorganic Chemistry, vol. 12, No. 5, pp. 616-620, 1967.
Sato, "Photocatalytic Activity of NOx-Doped TiO2 in the visible Light Region", Chemical Physics Letters, vol. 123, No. 1 & 2, pp. 126-128, 1986.
Schoonheydt et al., "Luminescence of Tris(2,2'-bipyridine)ruthenium(II) in Aqueous clay Mineral Suspensions", J. Phys. Chem., vol. 88, pp. 5113-5118, 1984.
Sterte, "Synthesis and Properties of titanium Oxide Cross-Linked Montmorillonite", Clays and Clay Minerals, vol. 34, No. 6, pp. 658-664, 1986.
Umebayashi et al., "Band gap narrowing of titanium dioxide by sulfur doping", Applied Physics Letters, vol. 81, No. 3, pp. 454-456, 2002.
Vaccari, "Preparation and catalytic properties of cationic and anionic clays", Catalysis Today, vol. 41, pp. 53-71, 1998.
Wong et al., "Reactively sputtered N-doped titanium oxide films as visible-light photocatalyst" Thin Solid Films, vol. 494, pp. 244-249, 2006.
Yang et al., "Nitrogen-doped titanium oxide films as visible light photocatalyst by vapor deposition", Thin Solid Films, vol. 469 & 470, pp. 1-5, 2004.

(Continued)

*Primary Examiner* — Elizabeth Wood
(74) *Attorney, Agent, or Firm* — Norton Rose Fulbright US LLP

(57) ABSTRACT

This present invention relates to a Ruthenium complex intercalated N-doped or N,S-codoped titania pillared montmorillonite, a multifunctional photocatalyst and a process for the preparation thereof. More particularly, the present invention provides a green photochemical route towards a variety of light driven redox reactions such as organic dye degradations, photocatalytic water splitting and various organic transformation reactions oriented to the synthesis of fine chemicals.

9 Claims, 3 Drawing Sheets

(56) References Cited

OTHER PUBLICATIONS

Figure 1:
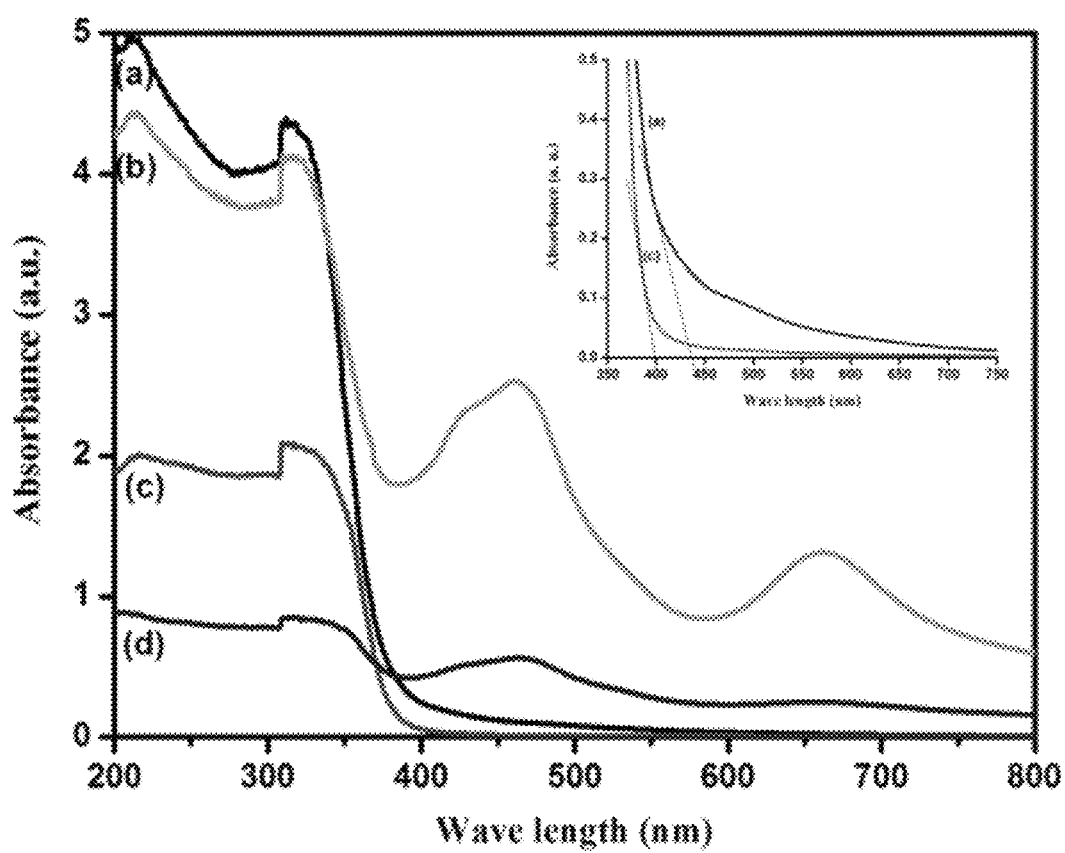

Yang et al., "Pillared Clays as Superior Catalysts for Selective Catalytic Reduction of NO with NH3", Ind. Eng. Chem. Res., vol. 31, pp. 1440-1445, 1992.

Yang et al., "Synthesis of WO3/tiO2 nanocomposites via sol-gel method", Journal of Alloys and Compounds, vol. 398, pp. 200-202, 2005.

Yu et al., "Preparation, characterization and photocatalytic activity of in situ N,S-codoped TiO2 powders", Journal of Molecular Catalysis A: Chemical, vol. 246, pp. 176-184, 2006.

Zhang et al., "Photocatalytic Degradation of 4BS Dye by N,S-Codoped TiO2 Pillared Montmorillonite Photocatalysts under Visible-Light Irradiation", J. Phys. Chem C, vol. 112, pp. 17994-17997, 2008.

Zhou et al., "Photodegradation of Benzoic Acid over Metal-Doped TiO2", Ind. Eng. Chem. Res., vol. 45, pp. 3503-3511, 2006.

* cited by examiner

RUTHENIUM COMPLEX INTERCALATED N-DOPED OR N,S-CODOPED TITANIA PILLARED MONTMORILLONITE AND A PROCESS FOR THE PREPARATION THEREOF

FIELD OF THE INVENTION

This present invention relates to a Ruthenium complex intercalated N doped or N,S-codoped titania pillared montmorillonite, a multifunctional photocatalyst and a process for the preparation thereof. More particularly, the present invention provides a green photochemical route towards a variety of light driven redox reactions such as organic dye degradation, photocatalytic water splitting and various organic transformation reactions oriented to the synthesis of fine chemicals.

The present invention particularly relates to the synthesis of N-doped titania pillared montmorillonite (NTP); N,S-codoped titania pillared montmorillonite (NSTP); Ruthenium bipyridyl complex intercalated N-doped titania pillared montmorillonite (RNTP); and Ruthenium bipyridyl complex intercalated N,S-codoped titania pillared montmorillonite (RNSTP).

BACKGROUND OF INVENTION

Titanium dioxide ($TiO_2$) has been proven one of the most promising photocatalysts for its intriguing properties like high chemical stability, strong oxidizing power, environment-friendliness, relative economy [H. Li, J. Li, Y. Huo, J. Phys. Chem. B 110 (2006) 1559; M.-S. Wong, H. P. Chou, T.-S. Yang, Thin Solid Films 494 (2006) 244] and so on. Though it is chemically and photochemically stable, at the same time $TiO_2$ photocatalyst is a ultra-violet absorber due to its large energy band gap (3.2 eV for anatase) so that the light utilization efficiency to solar irradiation is very low. Again demerits like low surface area and little adsorbability makes $TiO_2$ an unsuitable candidate for photocatalysis.

To effectively utilize visible light, which represents about 42% energy of the solar spectrum, much attention has been paid to improve the photocatalytic property and visible light response of $TiO_2$ [Y.-M. Lin, Y.-H. Tseng, C.-C. Chen, US Patent 20060034752A1 (2006)]. Among all the methods, a main approach is to dope transition metals into $TiO_2$ [S. Chang, R. Doong, J. Phys. Chem. B 110 (2006) 20808; A. V. Emeline, Y. Furubayashi, X. Zhang, M. Jin, T. Murakami, A. Fujishima, J. Phys. Chem. B 109 (2005) 24441; J. Zhou, Y. Zhang, X. S. Zhao, A. K. Ray, Ind. Eng. Chem. Res. 45 (2006) 3503; H. Liu, T. Peng, D. Ke, Z. Peng, C. Yan, Mater. Chem. Phys. 104 (2007) 377; H. M. Yang, R. R. Shi, K. Zhang, Y. H. Hua, A. D. Tang, X. W. Li, J. Alloys Compd. 398 (2005) 200]. But the non metal doping trend, first discovered by Sato in 1986 and rekindled by Asahi et al. in 2001, seems to be more successful than the transition metal doping [R. Asahi, T. Morikawa, T. Ohwaki, K. Aoki, Y. Taga, Science 293 (2001) 269; T. Umebayashi, T. Yamaki, H. Itoh, K. Asai, Appl. Phys. Lett. 81 (2002) 454; S. Sato, Chem. Phys. Lett. 123 (1986) 126]. It is because the metal ion doped $TiO_2$ suffers from thermal instability and the increase of carrier-recombination centres [M.-C. Yang, T.-S. Yang, M.-S. Wong, Thin Solid Films 469-470 (2004) 1]. Therefore non-metal doping into $TiO_2$ may be more appropriate for the extension of its photocatalytic activity into the visible region because their impurity states are near the valence band edge, and their role as recombination centres might be minimized as compared to metal cation doping [D. Chen, Z. Jiang, J. Geng, Q. Wang, D. Yang, Ind. Eng. Chem. Res. 46 (2007) 2741]. Meanwhile, codoped titania with multiple non-metal elements has attracted more attention, such as N,S-codoped $TiO_2$ as a decent visible light photocatalyst [J. Yu, M. Zhou, B. Cheng, X. Zhao, J. Mol. Catal. A: Chem. 246 (2006) 176].

Although the multiple non-metal doping can narrow the band gap of $TiO_2$ photocatalysts and improve the utilization of the solar spectrum, the surface area and adsorbability of the catalyst cannot be increased in this process. Therefore to overcome these difficulties some more modifications to the N,S-codoped $TiO_2$ is required.

For many years clay minerals have been the focus of intensive research due to their ability to intercalate various organic, organometallic or inorganic species into their interlamellar spaces and due to their catalytic properties. Montmorillonite K10 clay is a ubiquitous, inexpensive and non-toxic powder having a high cation exchange capacity (CEC), swelling and intercalation property. These profitable features of the cationic clay make it useful in the move towards establishing environmentally friendly catalysts [A. Vaccari, Catalysis Today 41 (1998) 53]. Due to the features like high CEC and expandable interlayer space, it can accommodate large inorganic metal hydroxycations that are oligomeric and formed by hydrolysis of metal oxides or salts [C. F. Baes, R. E. Meisner, The Hydrolysis of Cations, Wiley, N.Y., 1976].

There are inventions relating to this type of intercalation [J. R. McCauley, U.S. Pat. No. 4,980,047 (1990)]. After calcination the metal hydroxy cations are decomposed into oxide pillars and the materials as a whole get converted to pillared clays. In pillared clays, the oxide pillars keep the clay layers apart and create interlayer and interpillar spaces, thereby exposing the internal surfaces of the clay layer.

Baes and Meisner had reported that any metal oxide or salt that forms polynuclear species upon hydrolysis can be inserted as pillars. Titanium is known to form polymeric species in solution for quite some time [B. I. Nabivanets, L.N. Kudritskaya, Russ. J. Inorg. Chem. 12 (1967) 616; H. Einaga, J. Chem. Soc. Dalton Trans. 12 (1979) 1917]. A number of literatures were reported regarding the various methods to create titania complexes suitable for pillaring processes [J. Sterte, Clays and Clay Minerals 34 (1986) 658; A. Bernier, L. F. Admaiai, P. Grange, Appl. Catalysis 77 (1991) 269; R. T. Yang, J. P. Chen, E. S. Kikkinides, L. S. Cheng, J. E. Cichanowicz, Ind. Eng. Chem. Res. 31 (1992) 1440; N. N. Binitha, S. Sugunan, Micropor. and Mesopor. Mater. 93 (2006) 82; E. Dvininov, E. Popovici, R. Pode, L. Cocheci, P. Barvinschi, V. Nica, J. Hazard. Mater. 167 (2009) 1050; Y. Kitayama, T. Kodama, M. Abe, H. Shimotsuma, Y. Matsuda, J. Porous Mater. 5 (1998) 121; T. Kaneko, H. Shimotsuma, M. Kajikawa, J. Porous Mater. 8 (2001) 295].

Tris-(2, 2'-bipyridyl) ruthenium (II) complex is one of the molecule studied most extensively because of its unique combination of chemical stability, luminescence etc. It is well known for its property as a good photo sensitizer in the water splitting system to produce hydrogen. Various researchers have reported the synthesis of intercalation compounds using this complex in inorganic layered ion-exchanger matrices possessing a non rigid structure such as clay [R. A. Della-Guardia, J. K. Thomas, J. Phys. Chem. 87 (1983) 990; R.A. Schoonheydt, P. De Pauw, D. Vliers, F. C. De Schrijver, J. Phys. Chem. 88 (1984) 5113; V. Joshi, D. Kothar, P. K. Ghosh, J. Am. Chem. Soc. 108 (1986) 4650].

A number of literatures have already been cited regarding the improvement of visible light response of titania by non-metal doping along with pillaring it in clay matrix to improve its surface area as well as adsorbability and applying the modified catalyst in photocatalytic degradation of organic pollutants [G. Zhang, X. Ding, Y. Hu, B. Huang, X. Zhang, X. Qin, J. Zhou, J. Xie, J. Phys. Chem. C 112 (2008) 17994; Z. An-ning, C. You-mei, Y. Zhanjiang, J. of Coal Sci. & Eng. (China) 14 (2008) 517]. But till date neither any report has been published or patented on ruthenium bipyridyl complex intercalated N-doped or N,S-codoped titania pillared montmorillonite.

Thus the scientific literature for the first time discloses a Ruthenium bipyridyl complex intercalated N-doped or N,S-codoped titania pillared montmorillonite, acting as a proficient multifunctional catalyst in various light driven redox reactions. Every reaction involves two reaction pathways that occur under visible light irradiation. One is ascribed to complex photosensitization and the other to the band gap narrowing by only N or N and S doping.

Objectives of the Invention

The main objective of the present invention is to provide Ruthenium complex intercalated N-doped or N,S-codoped titania pillared montmorillonite useful as photocatalyst and a process for the preparation thereof which obviates the drawbacks of the hitherto known prior art as detailed above.

Another objective of the present invention is to provide a new preparation approach that furnishes an appealing pathway to prepare the catalyst under mild conditions utilizing various organic and inorganic materials.

Still another objective of the present invention is to provide a material showing synergistic effect of nonmetal doping, pillaring and complex intercalation that open up opportunities for green photocatalytic routes.

SUMMARY OF THE INVENTION

Accordingly, the present invention provides Ruthenium complex intercalated N-doped or N,S-codoped titania pillared montmorillonite useful as photocatalyst and a process for the preparation thereof.

In one embodiment of the present invention, Ruthenium complex intercalated doped titania pillared montmorillonite comprising Ruthenium complex in the range of 3 to 6 wt/wt %, titania in the range of 40 to 50 wt/wt % and montmorillonite in the range of 50-55 wt/wt %, dopant is in the range of 0.5-1.5 wt/wt % selected from the group consisting of N or N, S source, wherein N or N and S source is selected from the group consisting of urea, thiourea and their derivatives.

In another embodiment of the present invention, Ruthenium complex is selected from the group consisting from Ruthenium bipyridyl, Ruthenium phenanthroline.

In another embodiment of the present invention, Ruthenium complex intercalated co-doped titania pillared montmorillonite is useful as photo catalyst.

In another embodiment of the present invention, the invention provides a process for the preparation of Ruthenium complex intercalated doped titania pillared montmorillonite, wherein the said process comprising the steps of;
(a) preparing suspension of Montmorillonite in water;
(b) preparing a solution of N or N and S source, titanium (IV) oxysulfate sulfuric acid complex hydrate, ethanol, water under stirring at temperature ranging between 0 to 30° C.;
(c) adding solution as obtained in step (b) dropwise into the montmorillonite suspension as obtained in step (a) at temperature ranging between 80° C. to 90° C. for a period ranging between 8-9 h to obtain precipitate;
(d) washing of the precipitate as obtained in step (c) with water and drying for a period ranging between 12 h to 15 h at temperature ranging between 120° C. to 150° C. followed by activation of precipitate at temperature ranging between 450° C. to 600° C. for a period ranging between 4-5 h to obtain N or N, S doped Titania pillared montmorillonite;
(e) adding aqueous solution of Ruthenium complex selected from group consisting of Ruthenium bipyridyl or Ruthenium phenanthroline into the aqueous slurry of N or N, S doped Titania pillared montmorillonite as obtained in step (d) and drying the filtered materials under vacuum at temperature ranging between 80° C. to 90° C. for a period ranging between 5 h to 8 h to obtain Ruthenium complex intercalated N or N,S-co doped titania pillared montmorillonite.

In another embodiment of the present invention, montmorillonite used in step (a) is K10 montmorillonite and KSF montmorillonite.

In another embodiment of the present invention, N or N and S source used in step (b) is selected from the group consisting of urea, thiourea and their derivatives.

In another embodiment of the present invention, mol ratio of montmorillonite, titanium (IV) oxysulfate sulfuric acid complex hydrate, N or N and S source and Ruthenium bipyridyl complex is in the range of 1.25:1.0:0.1:0.015 to 1.23:1.1:0.09:0.016.

In another embodiment of the present invention, 20 mg to 50 mg photocatalyst is used to liberate 1694 to 4510 µmol $H_2$ in 150 to 180 min. of light illumination.

In another embodiment of the present invention, complete photodegradation of methyl orange occurs by using said photocatalyst in the range of 50 mg to 100 mg for period in the range of 45 min. to 120 min.

In another embodiment of the present invention, phenol conversion is done by using said photocatalyst is in the range of 14-26%.

The advantages of the present compositions and methods are:
1. A cost effective process of preparation of Ruthenium bipyridyl complex intercalated N-doped or N,S-co doped titania pillared montmorillonite.
2. The preparation of Ruthenium bipyridyl complex intercalated N-doped or N,S-co doped titania pillared montmorillonite includes the use of very cheap and easily available chemicals.
3. The preparation of Ruthenium bipyridyl complex intercalated N-doped or N,S-co doped titania pillared montmorillonite includes easy steps.
4. The compositions behave as a multifunctional photocatalyst utilizing visible light as the energy source.

BRIEF DESCRIPTION OF THE INVENTION

FIG. 1. UV-Vis Diffuse Reflectance Spectroscopy (DRS) of NSTP(a), RNSTP (b), NTP (c), RNTP (d). The inset denotes the specific absorption band edges of RNTP (a) and NTP (c).

Figure 2:
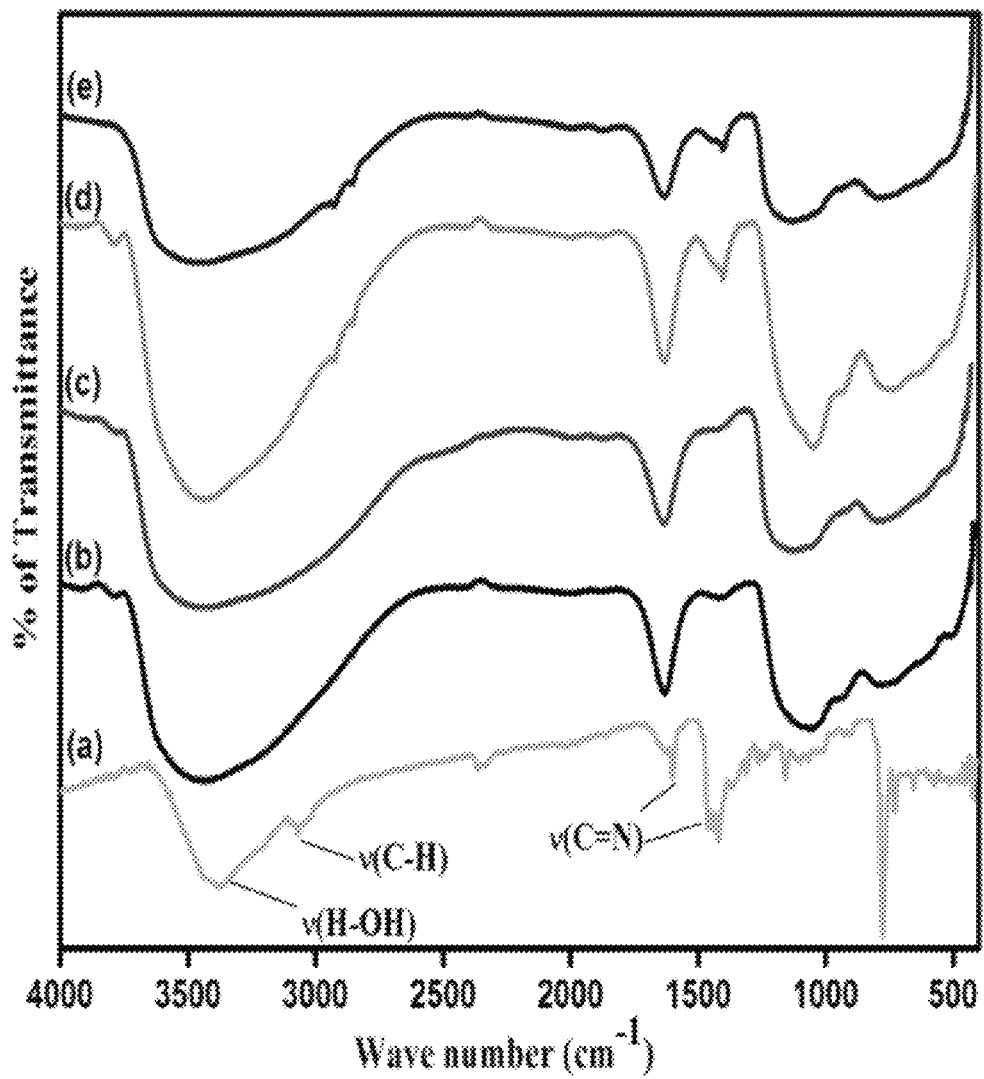

FIG. 2. FT-IR spectra of Ruthenium bipyridyl complex (a), NTP (b), NSTP (c), RNTP (d), RNSTP(e).

Figure 3:
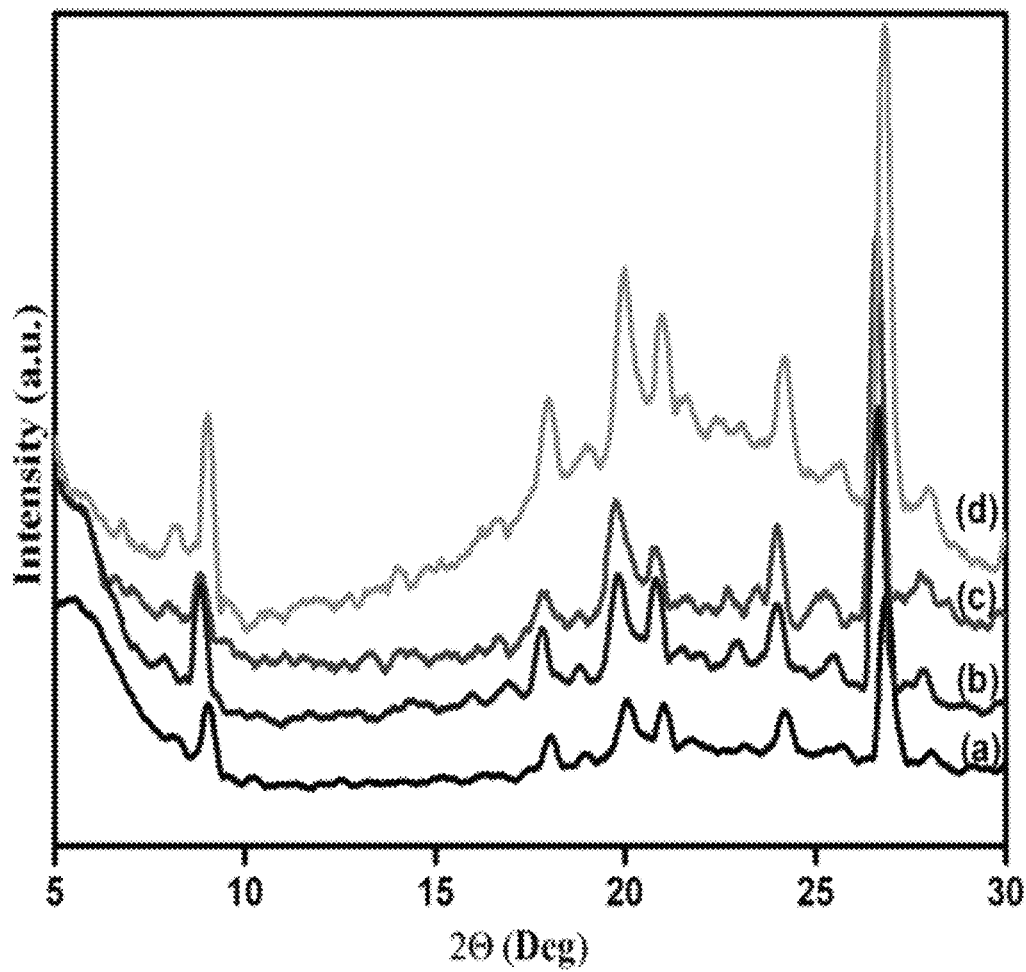

FIG. 3. XRD spectra of (a) NTP, (b) NSTP, (c) RNTP, (d) RNSTP.

DETAILED DESCRIPTION OF THE INVENTION

This invention relates to Ruthenium bipyridyl complex intercalated N-doped or N,S-codoped titania pillared montmorillonite, and process for preparation thereof. The present invention also provides comparative analysis of the catalytic efficiency (arising due to the synergistic effect of photosensitization of the Ruthenium complex and photochemically more ameliorated pillared montmorillonite) among the aforesaid catalysts by applying them in various reactions for instance photo catalytic degradation of methyl orange; in photo catalytic phenol hydroxylation and in UV-Vis photo catalytic water splitting.

The following examples are given by way of illustration for the working of the invention in actual practice and therefore, should not be construed to limit the scope of the present invention.

Example 1

Preparation of N-doped titania pillared montmorillonite (NTP)
(Conditions: Montmorillonite=5.5 g, Titanium (IV) oxysulfate=13.8 g, Ethanol=69.5 ml, Water=820.5 ml, Urea=90 g)

An aqueous suspension of montmorillonite is prepared by adding 5.5 g montmorillonite to 750 ml water under vigorous stirring for 5 h at 30° C. Another solution is prepared by stirring 13.8 g of titanium (IV) oxysulfate sulfuric acid complex hydrate with 90 g urea, 69.5 ml ethanol and 77.5 ml water for 5 h at 30° C. This clear solution is then added drop-wise into the suspension of montmorillonite with vigorous stirring for 8 h at 80° C. The precipitate is recovered from the mixture by centrifuging and washed with deionized water for several times. It is then dried at 120° C. overnight (12 h) and calcined at 450° C. for 5 h, which resulted in the formation of N-doped titania pillared montmorillonite (yield=78%). The material is characterized by X-ray diffraction (XRD), UV-vis diffused reflectance spectroscopy (UV-vis DRS) and FT-IR spectroscopy. Chemical composition of the sample is determined by X-ray Fluorescence spectroscopy (XRF) and CHN analysis. The composition of the materials (in wt %) is found to be $SiO_2$:40, $Al_2O_3$:3, $Fe_2O_3$:1.6, CaO:2.2, MgO:2.5, $Na_2O$:0.09, $K_2O$:1.5, $TiO_2$:42 with 0.2 wt % N content.

Example 2

Preparation of N,S-codoped titania pillared montmorillonite (NSTP)
(Conditions: Montmorillonite=5.5 g, Titanium (IV) oxysulfate=13.8 g, Ethanol=69.5ml, Water=820.5 ml, Thiourea=7.6 g)

An aqueous suspension of montmorillonite is prepared by adding 5.5 g montmorillonite to 750 ml water under vigorous stirring for 5 h at 30° C. Another solution is prepared by stirring 13.8 g of titanium (IV) oxysulfate sulfuric acid complex hydrate with 7.6 g thiourea, 69.5 ml ethanol and 77.5 ml water for 5 h under ice cold condition (4° C.). This clear solution is then added drop-wise into the suspension of montmorillonite, under vigorous stirring for 8 h at 80° C. The precipitate is recovered from the mixture by centrifuging and washed with deionized water for several times. It is then dried at 120° C. overnight (12 h) and calcined at 450° C. for 5 h, which resulted in the formation of N,S-codoped titania pillared montmorillonite (yield=80%). The material is characterized by X-ray diffraction (XRD), $N_2$ adsorption-desorption, UV-vis diffused reflectance spectroscopy (UV-vis DRS) and FT-IR spectroscopy. Chemical composition of the sample is determined by X-ray Fluorescence spectroscopy (XRF) and CHN analysis. The composition of the materials (in wt %) is found to be $SiO_2$:42, $Al_2O_3$:4, $Fe_2O_3$:1.8, CaO:2.2, MgO: 2.5, $Na_2O$:0.1, $K_2O$:1.5, $TiO_2$:40 with 0.31 wt % N and 0.9 wt % S.

Example 3

Preparation of Ruthenium bipyridyl complex
(Conditions: $RuCl_3$=0.415 g, 2,2'-bipyridyl=0.997 g, Ethanol=20 ml, Sodium borohydrate=0.074 g)

A tris bipyridyl ruthenium (II) complex is prepared by refluxing a mixture of ethanolic solution (80 ml) of 0.415 g of $RuCl_3$, 0.997 g of 2,2'-bipyridyl and 0.074 g of sodium borohydrate in a 250 ml two necked round bottom flask for 6 h at 70° C. Then the excess ethanol is evaporated to leave the crystalline complex. The complex was characterized by CHN analysis and Fourier-transform infrared spectroscopy (FT-IR).

Example 4

Preparation of Ruthenium bipyridyl complex intercalated N-doped titania pillared montmorillonite (RNTP)
(Conditions: Tris bipyridyl ruthenium(II) complex=0.7 g, Water=85 ml, NTP(N-doped titania pillared montmorillonite)=1 g)

About 1 g N-doped titania pillared montmorillonite prepared in Example 1 is stirred with 50 ml deionized water for 1 h at 30° C. Then 0.7 g of ruthenium complex prepared in Example 3 in 10 ml deionized water is added to it under reflux accompanied by stirring. An additional 25 ml of deionized water is added to the solution and it is refluxed overnight (12 h) at 100° C. The solution is filtered and the filtered material is dried under vacuum at 80° C. for 5 h (yield=88%). The material is characterized by $N_2$ adsorption-desorption isotherm, FT-IR analysis and TG-DTA analysis. (yield=75%). The material is characterized by X-ray diffraction (XRD), $N_2$ adsorption-desorption, UV-vis diffused reflectance spectroscopy (UV-vis DRS) and FT-IR spectroscopy. Chemical composition of the sample is determined by X-ray Fluorescence spectroscopy (XRF) and atomic absorption spectroscopy. The composition of the materials (in wt % ) is found to be $SiO_2$:41, $Al_2O_3$:3, $Fe_2O_3$:1.8, CaO:2.2, MgO:2.5, $Na_2O$:0.09, $K_2O$:1.5, $TiO_2$:42 with N:0.2 and ruthenium complex:5.

Example 5

Preparation of Ruthenium bipyridyl complex intercalated N,S-codoped titania pillared montmorillonite (RNSTP)
(Conditions: Tris bipyridyl ruthenium(II) complex=0.7 g, Water=85 ml, NSTP(N,S-codoped titania pillared montmorillonite)=1 g)

1 g N,S-codoped titania pillared montmorillonite prepared in Example 2 is stirred with 50 ml deionized water for 1 h at 30° C. Then 0.7 g of ruthenium complex prepared in Example 3 in 10 ml deionized water is added to it under reflux accompanied by stirring. An additional 25 ml of deionized water is added to the solution and it is refluxed overnight (12 h) at 100° C. The solution is filtered and the filtered material is dried under vacuum at 80° C. for 5 h (yield=78%). The material is characterized by X-ray diffraction (XRD), $N_2$ adsorption-desorption, UV-vis diffused reflectance spectroscopy (UV-vis DRS) and FT-IR spectroscopy. Chemical composition of the sample is determined by X-ray Fluorescence spectroscopy (XRF) and atomic absorption spectroscopy. The composition of the materials (in wt % ) is found to be $SiO_2$:41, $Al_2O_3$:4, $Fe_2O_3$:1.8, CaO:2.1, MgO:2.5, $Na_2O$:0.1, $K_2O$:1.5, $TiO_2$:40 with N:0.31, S:1.0 and ruthenium complex: 4.9.

Example 6

Photocatalytic water splitting over N-doped titania pillared montmorillonite
(Conditions: Catalyst(NTP)=0.02 g, Time duration=3 h, Light source=125 W visible lamp)

Photochemical hydrogen generation experiments are carried out using a quartz batch reactor that is exposed to the light of medium pressure 125 W mercury visible lamp. The photon flux in the quartz flask is found to be $7 \times 10^{19}$ photons/s for the 254 nm spectral region, as determined with ferrioxalate chemical actinometry. For catalytic measurements, the glass flask is charged with 20 mg of catalyst in 20 ml of 10 vol % methanol. The $H_2$ liberated is observed to be 1694.8 μmol using 0.02 g of catalyst in 3 h of light illumination. (The evolved gas is collected by water displacement technique and is analysed by an offline gas chromatograph.)

Example 7

Photocatalytic water splitting over N,S-codoped titania pillared montmorillonite
(Conditions: Catalyst (NSTP)=0.02 g, Time duration=3 h, Light source=125 W visible lamp)

Photochemical hydrogen generation experiments are carried out using a quartz batch reactor that is exposed to the light of medium pressure 125 W mercury visible lamp. For catalytic measurements, the glass flask is charged with 20 mg of catalyst in 20 ml of 10 vol % methanol. The $H_2$ liberated is observed to be 2010.3 μmol using 0.02 g of catalyst in 3 h of light illumination.

Example 8

Photocatalytic water splitting over ruthenium bipyridyl complex intercalated N-doped titania pillared montmorillonite
(Conditions: Catalyst (RNTP)=0.02 g, Time duration=3 h, Light source=125 W visible lamp)

Photochemical hydrogen generation experiments are carried out using a quartz batch reactor that is exposed to the light of medium pressure 125 W mercury visible lamp. For catalytic measurements, the glass flask is charged with 20 mg of catalyst in 20 ml of 10 vol % methanol. The $H_2$ liberated is observed to be 3808.2 μmol using 0.02 g of catalyst in 3 h of light illumination.

Example 9

Photocatalytic water splitting over ruthenium bipyridyl complex intercalated N,S-codoped titania pillared montmorillonite
(Conditions: Catalyst (RNSTP)=0.02 g, Time duration=3 h, Light source=125 W visible lamp)

Photochemical hydrogen generation experiments are carried out using a quartz batch reactor that is exposed to the light of medium pressure 125 W mercury visible lamp. For catalytic measurements, the glass flask is charged with 20 mg of catalyst in 20 ml of 10 vol % methanol. The $H_2$ liberated is observed to be 4510.0 μmol using 0.02 g of catalyst in 3 h of light illumination.

Example 10 photocatalytic dye degradation over N-doped titania pillared montmorillonite
(Conditions: Catalyst(NTP)=0.05 g, Methyl orange=20 ml (100 ppm), Light source=sunlight)

Photocatalytic degradation of methyl orange is studied using sunlight as the energy source. Prior to the start of light experiment, dark adsorption experiments are carried out for 30 min under continuous stirring. For catalytic measurement, a 100 ml flask is charged with 0.05 g of catalyst in 20 ml of 100 ppm methyl orange solution at 38° C. It is then analysed by a UV-vis spectrophotometer at 500 nm wave length. The complete degradation of the dye is achieved in 120 min using 0.05 g of catalyst.

Example 11

Photocatalytic dye degradation over N,S-codoped titania pillared montmorillonite
(Conditions: Catalyst (NSTP)=0.05 g, Methyl orange=20 ml (100 ppm), Light source=sunlight)

Photocatalytic degradation of methyl orange is studied using sunlight as the energy source. Prior to the start of light experiment, dark adsorption experiments are carried out for 30 min under continuous stirring. For catalytic measurement, a 100 ml flask is charged with 0.05 g of catalyst in 20 ml of 100 ppm methyl orange solution at 40° C. It is then analysed by a UV-vis spectrophotometer at 500 nm wave length. The complete degradation of the dye is achieved in 90 min using 0.05 g of catalyst.

Example 12

Photocatalytic dye degradation over ruthenium bipyridyl complex intercalated N-doped titania pillared montmorillonite
(Conditions: Catalyst (RNTP)=0.05 g, Methyl orange=20 ml (100 ppm), Light source=sunlight)

Photocatalytic degradation of methyl orange is studied using sunlight as the energy source. Prior to the start of light experiment dark, adsorption experiments are carried out for 30 min under continuous stirring. For catalytic measurement, a 100 ml flask is charged with 0.05 g of catalyst in 20 ml of 100 ppm methyl orange solution at 40° C. It is then analysed by a UV-vis spectrophotometer at 500 nm wave length. The complete degradation of the dye is achieved in 75 min using 0.05 g of catalyst.

Example 13

Photocatalytic dye degradation over ruthenium bipyridyl complex intercalated N,S-codoped titania pillared montmorillonite
(Conditions: Catalyst (RNSTP)=0.05 g, Methyl orange=20 ml (100 ppm), Light source=sunlight)

Photocatalytic degradation of methyl orange is studied using sunlight as the energy source. Prior to the start of light experiment, dark adsorption experiments are carried out for 30 min under continuous stirring. For catalytic measurement, a 100 ml flask is charged with 0.05 g of catalyst in 20 ml of 100 ppm methyl orange solution at 40° C. It is then analysed by a UV-vis spectrophotometer at 500 nm wave length. The complete degradation of the dye is achieved in 45 min. using 0.05 g of catalyst.

Example 14

Photocatalytic phenol hydroxylation over N-doped titania pillared montmorillonite
(Conditions: Catalyst (NTP)=0.04 g, Phenol=40 ml (10 ppm), Light source=sunlight)

Photochemical phenol hydroxylation experiments are carried out in presence of sunlight. For catalytic measurements, the glass flask is charged with 40 mg of catalyst in 40 ml of 10 ppm phenol solution at 42° C. The reaction mixture is stirred with a magnetic impeller. The product is analysed by an offline gas chromatograph. The main products obtained are catechol and hydroquinone with a small trace of benzoquinone. The phenol conversion is observed to be 14% with 59% catechol and 39.7% hydroquinone selectivity respectively using 0.04 g of catalyst in 120 min. of light illumination.

Example 15

Photocatalytic phenol hydroxylation over N,S-codoped titania pillared montmorillonite
(Conditions: Catalyst (NSTP)=0.04 g, phenol=40 ml (10 ppm), Light source=sunlight)

Photochemical phenol hydroxylation experiments are carried out in presence of sunlight. For catalytic measurements, the glass flask is charged with 40 mg of catalyst in 40 ml of 10 ppm phenol solution at 42° C. The reaction mixture is stirred with a magnetic impeller. The product is analysed by an offline gas chromatograph. The main products obtained are catechol and hydroquinone with a small trace of benzoquinone. The phenol conversion is observed to be 18% with 63% catechol and 36.5% hydroquinone selectivity respectively using 0.04 g of catalyst in 120 min. of light illumination.

Example 16

Photocatalytic phenol hydroxylation over ruthenium bipyridyl complex intercalated N-doped titania pillared montmorillonite
(Conditions: Catalyst (RNTP)=0.04 g, phenol=40 ml (10 ppm), Light source=sunlight)

Photochemical phenol hydroxylation experiments are carried out in presence of sunlight. For catalytic measurements, the glass flask is charged with 40 mg of catalyst in 40 ml of 10 ppm phenol solution at 42° C. The reaction mixture is stirred with a magnetic impeller. The product is analysed by an offline gas chromatograph. The main products obtained are catechol and hydroquinone with a small trace of benzoquinone. The phenol conversion is observed to be 23% with 68% catechol and 32% hydroquinone selectivity respectively using 0.04 g of catalyst in 120 min. of light illumination.

Example 17

Photocatalytic phenol hydroxylation over ruthenium bipyridyl complex intercalated N,S-codoped titania pillared montmorillonite
(Conditions: Catalyst (RNSTP)=0.04 g, phenol=40 ml (10 ppm), Light source=sunlight)

Photochemical phenol hydroxylation experiments are carried out in presence of sunlight. For catalytic measurements, the glass flask is charged with 40 mg of catalyst in 40 ml of 10 ppm phenol solution at 42° C. The reaction mixture is stirred with a magnetic impeller. The product is analysed by an offline gas chromatograph. The main products obtained are catechol and hydroquinone with a small trace of benzoquinone. The phenol conversion is observed to be 26% with 63% catechol and 37% hydroquinone selectivity respectively using 0.04 g of catalyst in 120 min. of light illumination.

What is claimed is:

1. A titania pillared montmorillonite catalyst comprising:
   ruthenium complex in the range of 3 to 6 wt/wt %;
   titania in the range of 40 to 50 wt/wt %;
   montmorillonite in the range of 50-55 wt/wt %; and
   N or N,S dopant in the range of 0.5-1.5 wt/wt % wherein the N or N, S dopant is from a source selected from a group consisting of urea and thiourea.

2. The catalyst of claim 1, wherein ruthenium complex is Ruthenium bipyridyl or Ruthenium phenanthroline.

3. A process for the preparation of the catalyst of claim 1, comprising:
   (a) preparing a suspension of K10 montmorillonite or KSF montmorillonite in water;
   (b) preparing a solution comprising N or N and S dopant, titanium (IV) oxysulfate sulfuric acid complex hydrate, ethanol, and water;
   (c) adding the solution to the montmorillonite suspension and obtaining a precipitate;
   (d) washing of the precipitate with water and drying followed by activating the precipitate to obtain N-doped or N, S co-doped Titania pillared montmorillonite; and
   (e) adding an aqueous solution of Ruthenium bipyridyl or Ruthenium phenanthroline to the N-doped or N, S doped Titania pillared montmorillonite and drying under vacuum at a temperature ranging between 80° C. to 90° C. for a period ranging between 5 h to 8 h to obtain Ruthenium complex intercalated N doped or N and S-co doped titania pillared montmorillonite catalyst.

4. The process of claim 3, wherein the solution comprising N or N and S dopant, titanium (IV) oxysulfate sulfuric acid complex hydrate, ethanol, and water is prepared at a temperature ranging between 0 to 30° C.

5. The process of claim 3, wherein the precipitate is obtained by adding the solution drop-wise into the montmorillonite suspension at a temperature ranging between 80° C. to 90° C. for a period ranging between 8-9 h.

6. The process of claim 3, wherein the precipitate is washed and dried for a period ranging between 12 h to 15 h at a temperature ranging between 120° C. to 150° C.

7. The process of claim 3, wherein the precipitate is activated at a temperature ranging between 450° C. to 600° C. for a period ranging between 4-5 h.

8. The process of claim 3, wherein the Ruthenium complex intercalated N doped or N and S-co doped titania pillared montmorillonite is dried under vacuum at a temperature ranging between 80° C. to 90° C. for a period ranging between 5 h to 8 h.

9. The process of claim 3, wherein the montmorillonite, titanium (IV) oxysulfate sulfuric acid complex hydrate, N or N and S dopant and Ruthenium bipyridyl complex has a mole ratio in a range of 1.25:1.0:0.1:0.015 to 1.23:1.1:0.09:0.016.

* * * * *